United States Patent [19]

Renker

[11] 4,405,683
[45] Sep. 20, 1983

[54] SURFACE PLATE AND SLIDEWAY ELEMENTS

[75] Inventor: Hansjörg Renker, Hilterfingen, Switzerland

[73] Assignee: Fritz Studer AG, Glockenthal, Switzerland

[21] Appl. No.: 240,911

[22] Filed: Mar. 5, 1981

[30] Foreign Application Priority Data

Mar. 21, 1980 [CH] Switzerland ............... 2219/80

[51] Int. Cl.³ .................. B32B 5/16; B32B 9/00
[52] U.S. Cl. .................. 428/323; 428/331; 428/413; 428/480
[58] Field of Search .......... 428/331, 413, 323, 480

[56] References Cited

U.S. PATENT DOCUMENTS 4,084,863 4/1978 Cugelli .................. 428/306
4,131,590 12/1978 DeFrank .................. 428/413

Primary Examiner—William J. Van Balen
Attorney, Agent, or Firm—Murray Schaffer

[57] ABSTRACT

In the case of surface plate and slideway portions made from natural rock or artificial rock as the base layer, a plastic-bound outer layer containing hard material portions and in which are also incorporated solid lubricant portions is applied to the base layer. This leads to workpieces with high abrasion resistance and good sliding characteristics.

1 Claim, 2 Drawing Figures

SURFACE PLATE AND SLIDEWAY ELEMENTS

BACKGROUND OF THE INVENTION

The invention relates to surface plate and slideway elements made from natural rock or artificial rock formed by means of a bonding material.

Surface plate and slideway elements made from natural rock or artificial rock formed by means of a bonding material is nowadays used to a considerable extent in technology. The surface or straightening plate generally is formed from natural granite or serpentine (massive or fibrous, often mottled green or yellow, hydrous magnesium silicate) or in some cases artificially produced granite or serpentine. In the case of diamond turning or milling machines, the complete machine bed is often made from rock and the slideway elements are also made from such a material.

The rock surface plates and slideways are subject to unavoidable wear during use. In order to ensure the necessary complete flatness, surface plate must be reworked and measured at certain intervals. This is also necessary in the case of slideway elements made from rock and which are subject to wear during use.

Considerable time losses and high costs result from these constantly recurring maintenance and control activities.

A low friction coefficient is of considerable advantage both in the case of surface plates on which workpieces are moved backwards and forwards and on slideway elements which are moved relative to one another.

It should be noted that a relatively high friction coefficient must be expected when pairing metallic workpieces with those made from rock and when pairing individual rockmade workpieces.

BRIEF SUMMARY OF THE INVENTION

The problem of the invention is to treat surface plate and slideway elements made from natural rock or artificial rock formed by means of bonding materials in such a way that during the period of use wear can be reduced and the necessary reworking and subsequent controls are reduced to a minimu.

In addition, the friction coefficient is to be reduced in the case of mating pairs of metallic workpieces and rock workpieces and when individual rock workpieces are involved.

According to the invention, this is achieved in that said components have at least one outer layer containing hard material portions. The outer layers containing hard material portions can additionally contain a solid lubricant layer.

BRIEF DESCRIPTION OF THE DRAWINGS

The invention is described in greater detail hereinafter relative to two non-limitative embodiments and the attached drawings wherein show.

DETAILED DESCRIPTION OF THE PREFERRED EMBODIMENTS

Figure 1:
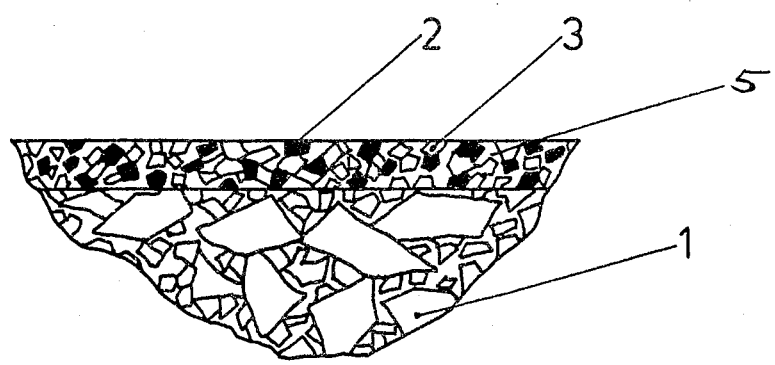
FIG. 1 a cross-section through a partly shown surface provided with hard material portions and solid lubricant incorporated into the layer.

The cross-section shown in FIG. 1 shows a hard material layer comprising particles 3 and in which are incorporated solid lubricant portions 2 applied to a base layer 1 made from natural or artificial rock. Hard material portions 3 and solid lubricant portions 2 are held together by a bonding material 5, e.g. plastic.

Figure 2:
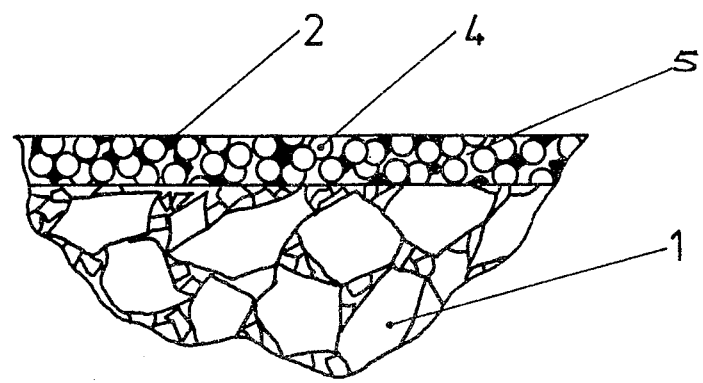
FIG. 2 a cross-section through a partly shown surface plate coated with spherical hard material portions and in which a solid lubricant is once again incorporated into the layer.

The cross-section shown in FIG. 2 shows a hard material layer of spherical particles 4 in which are incorporated solid lubricant portions 2 applied to the base layer 1 of natural or artificial rock. The hard material portions 4 of spherical particles and the solid lubricant portions 2 are held together by a bonding material 5, e.g. plastic.

The base layer is formed from the following materials: Synthetic or artificial rock is a material formed of a mixture of stone, gravel, sand and filler powder bound with an organic or anorganic binding material, e.g. a two components epoxy resin or a hydraulic cement (concrete). The components can be varied within wide limits. Natural rock is a material which has been shaped into the desired form by cutting and can be e.g. gabbro granite, marble or siliceous limestone.

The present hard material layers used as outer layers increase the strength of a surface plate and slideway element made from natural rock or artificial rock formed by means of a bonding material to an extraordinary extent.

For forming the outer surface of the surface plate and slideway element of this invention, no pressure or heat is used, except tha the temperature should be at least 20° C. The surface is machined by pregrinding with diamond wheels and finished by lapping with diamond grit. First, the base part is formed and then the surface of the base part is coated with hard material mixed with the binder and solid lubricant or mineral filler. The binder ensures inter alia that the coating is fixedly arranged on the surface of the base part.

The composition of the hard material layer can be varied within wide limits. The proportion of hard material portions 3, 4 and solid lubricant portions 2 to the proportion of synthetic resin 5 is dependent on the filling capacity thereof. For example, a bonding material 5 made from an epoxy resin permits a higher proportion of hard material portions 3, 4 and solid lubricant portions 2 than a bonding material made from a polyester resin.

Depending on whether the surface produced on the finished workpiece is to have high hardness or good sliding properties, the proportion of hard material portions 3, 4 or the proportion of solid lubricant portions 2 can be correspondingly increased.

By means of the incorporation of solid lubricant portions 2 into the matrix of the outer layer, the friction coefficient with respect to metallic workpieces or to rock sliding surfaces is reduced.

The hard material can range in amount from 20 to 55 wt. % when an epoxy resin is used, and from 20 to 40 wt. % when a polyester resin is used. The solid lubricant can be varied in amount within wide limits, e.g., from 5% to 80 wt. %, and can be replaced partially or wholly by a mineral filler. The bonding material, i.e., the resin system, can be varied in amount between 20 and 50 wt. % when an epoxy resin is used and between 20 and 40 wt. % when a polyester resin is used.

Suitable hard materials are: aluminum oxide, silicon carbinde (SiC), silica (SiO$_2$), metal carbides (WC; TiC) and diamond. Suitable solid lubricants are: ultra-fine graphite, poly(tetrafluoroethylene), molybdenum disulfide (MoS$_2$) and boron nitride. Suitable binders are: epoxy resins and polyester resins. The following are indicative of suitable resins of these types:

Araldite epoxy resins (CIBA-Geigy) are available in a plurality of products. Also polyester resins are available in a plurality of products, prepared by Shell, Dupont, ICI and other firms.

EXAMPLE 1

The following is an example of the composition of the outer layer of the surface plate according to the invention:
50% hard material portions, i.e. here aluminium oxide (Al$_2$O$_3$), particle size 0.2 to 1.0 mm
20% solid lubricant portions, here ultra-fine graphite, particle size 0.05 to 0.1 mm
30% synthetic resin, here araldite epoxy resin HY167, BY167 (CIBA-GEIGY).

Other examples of the composition of the outer layer of the surface plate or slideway element follow:

EXAMPLE 2

40 wt. % Al$_2$O$_3$
20 wt. % poly(tetrafluoroethylene)
40 wt. % polyester resin

EXAMPLE 3

20 wt. % SiC
30 wt. % MoS$_2$
50 wt. % Araldite expoxy resin BY167 (Resin)/HY 167 (Hardener), e. in the proportion Resin:Hardener of 70:30

EXAMPLE 4

55 wt. % SiO$_2$
25 wt. % boron nitride
20 wt. % Araldite epoxy resin BY167/HY 108 (Hardener) e.g. in the proportion Resin:Hardener of 92:8

EXAMPLE 5

50 wt. % WC
20 wt. % ultra-fine graphite, particle size 0.05–0.1 mm,
30 wt. % Araldite epoxy resin BY167/HY 167 (70:30)

Other metal carbides, such as TiC, as well as diamond, can be substituted for the WC of Example 5.

EXAMPLE 6

It is also possible to form the outer surface composition approximately without the use of solid lubricant, as follows:
50 wt. % hard material
20 wt. % mineral filler, e.g., fine milled gabbro granite
30 wt. % synthetic resin binder
In general, the amount of mineral filler can be varied within wide limits from
0.5 to 94 wt. %.
Other suitable mineral fillers include basalt, serpentine, diabas or talcum separately or in combination.

In the foregoing Examples, the hard material can either be in the form of fine particles or spherical beads. The size range for the particles is from 1 μm (dust) to 1 mm. The spherical beads are suitably formed by pressing the material into a spherical form followed by a sintering operation. Another forming method is the crushing of the hard material and rollgrinding or vibratory grinding of the crushed material together with an abrasive.

The plates and slideway surfaces of this invention are used in measuring machines, machine tools and for jigs.

What is claimed is:

1. A low friction plastic-like coating on a substantially planar base of natural or artificial rock forming a hardened layer that when ground has specified low friction properties, said coating consisting essentially of a mixture of particulate solid lubricants selected from the group consisting of ultra-fine particles of graphite, poly (tetra-fluoroethylene), molybdenum disulfide, and boron nitride, a relatively hard particulate filler selected from the group consisting of aluminum oxide, silica, silicon carbide, silicon dioxide, diamond and metal carbides, and a resinous binding agent selected from the group consisting of epoxy and polyester resins, said solid lubricants comprising approximately 20 percent, by weight, of the mixture and having a particle size that ranges from 0.05 to 0.1 mm, said filler comprising approximately 50 percent, by weight, of the mixture and having a particle size from 1 μm to 1 mm, said resinous binding agent comprising approximately 20 to 50 percent, by weight, of the mixture whereby when the mixture sets and is ground, the surface formed thereby contains exposed solid lubricants.

* * * * *